United States Patent
Ko et al.

(10) Patent No.: US 8,548,406 B2
(45) Date of Patent: Oct. 1, 2013

(54) METHOD OF TRANSMITTING REFERENCE SIGNAL IN MULTIPLE ANTENNA SYSTEM

(75) Inventors: Hyunsoo Ko, Gyeongki-do (KR); Moon Il Lee, Gyeongki-do (KR); Jaho Koo, Gyeongki-do (KR); Jae Hoon Chung, Gyeongki-do (KR); Bin Chul Ihm, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 12/773,439

(22) Filed: May 4, 2010

(65) Prior Publication Data

US 2010/0285762 A1  Nov. 11, 2010

Related U.S. Application Data

(60) Provisional application No. 61/175,787, filed on May 5, 2009.

(30) Foreign Application Priority Data

Aug. 10, 2009 (KR) ........................ 10-2009-0073435

(51) Int. Cl.
  *H01Q 11/12* (2006.01)
(52) U.S. Cl.
  USPC ........ 455/127.1; 455/101; 455/450; 370/311; 370/252

(58) Field of Classification Search
  USPC ............. 455/450, 127.1, 101; 370/311, 252, 370/267
  See application file for complete search history.

(56) References Cited

U.S. PATENT DOCUMENTS

| | | | |
|---|---|---|---|
| 2009/0028112 A1* | 1/2009 | Attar et al. | 370/332 |
| 2010/0173640 A1* | 7/2010 | Pajukoski et al. | 455/450 |
| 2010/0246705 A1* | 9/2010 | Shin et al. | 375/267 |
| 2011/0038271 A1* | 2/2011 | Shin et al. | 370/252 |
| 2011/0280169 A1* | 11/2011 | Seo et al. | 370/311 |

* cited by examiner

*Primary Examiner* — Junpeng Chen
(74) *Attorney, Agent, or Firm* — Morgan, Lewis & Bockius LLP

(57) ABSTRACT

A method of transmitting an uplink reference signal in a multiple antenna system is provided. A user equipment transmits a first sounding reference signal for uplink channel measurement on a first antenna by using at least one power amplifier among a plurality of power amplifiers, and transmits a second sounding reference signal for uplink channel measurement on a second antenna by using the at least one power amplifier, wherein the first sounding reference signal and the second sounding reference signal are transmitted using different time regions when using one power amplifier, and the first sounding reference signal and the second sounding reference signal are transmitted using different time regions or different frequency regions when using the plurality of power amplifiers.

9 Claims, 13 Drawing Sheets

FIG. 1
PRIOR ARTS

FIG. 2
PRIOR ARTS

FIG. 3
PRIOR ARTS

FIG. 4
PRIOR ARTS

METHOD OF TRANSMITTING REFERENCE SIGNAL IN MULTIPLE ANTENNA SYSTEM

CROSS-REFERENCE TO RELATED APPLICATIONS

This application claims the benefit of priority of U.S. Provisional application Ser. No. 61/175,787 filed on May 5, 2009 and Korean Patent Application No. 10-2009-0073435 filed on Aug. 10, 2009 which are incorporated by reference in its entirety herein.

BACKGROUND

1. Technical Field

The present invention relates to wireless communications, and more particularly, to a method of transmitting a reference signal in a multiple antenna system.

2. Related Art

To maximize performance and communication capability of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

At present, it is considered in a current multiple antenna system that a base station (BS) uses a plurality of power amplifiers to perform multiple antenna transmission whereas a user equipment (UE) uses one power amplifier to perform multiple antenna transmission. The UE using one power amplifier may obtain a receive diversity effect by receiving an Rx signal through multiple antennas. However, since the UE uses a single antenna when transmitting a signal, the UE cannot obtain a multiple antenna effect such as transmit diversity, spatial multiplexing, or the like. To increase the multiple antenna effect in transmission, an antenna selection scheme is used. The antenna selection scheme includes a closed-loop antenna selection scheme in which an antenna to be used is reported to a transmitting side designated by a receiving side and an open-loop antenna selection scheme in which the antenna to be used is randomly selected by the transmitting side. A power amplifier of the UE has a maximum output (e.g., the maximum output of the UE may be 23 dBm), and uplink power control is performed according to the maximum output.

To improve an uplink transfer rate, a multiple antenna transmission scheme of the UE has to be taken into account. When designing the multiple antenna transmission scheme, a sum of outputs of signals transmitted through the multiple antennas of the UE has to be equal to a maximum output considered in single antenna transmission. For example, assume that the maximum output of the single antenna is 23 dBm. Then, if the UE uses two antennas, each antenna may be implemented to have a maximum output of 20 dBm so that a sum of maximum outputs of signals transmitted from the two antennas is 23 dBm. If the UE uses four antennas, each antenna may be implemented to have a maximum output of 17 dBm so that a sum of maximum outputs of signals transmitted from the four antennas is 23 dBm. As such, a power amplifier of a UE using multiple antennas may be designed to have a lower maximum output than a UE using a single antenna. For example, when a power amplifier of a UE having a single antenna has a maximum output of 23 dBm, power amplifiers of respective antennas of a UE having two antennas may be designed to have a maximum output of 20 dBm, and power amplifiers of respective antennas of a UE having four antennas may be designed to have a maximum output of 17 dBm.

A UE using a plurality of power amplifiers in the multiple antenna system may transmit orthogonal reference signals for each Tx antenna. In this case, Tx power of a reference signal may be different from that of a data signal due to the limited maximum output of the power amplifier of the UE, and thus the coverage of the reference signal may not coincide with the coverage of the data signal.

Accordingly, there is a need for a method capable of effectively transmitting an uplink reference signal from a UE using a plurality of power amplifiers in a multiple antenna system.

SUMMARY

The present invention provides a method of effectively transmitting an uplink reference signal in a multiple antenna system.

According to an aspect of the present invention, a method of transmitting an uplink reference signal in a multiple antenna system is provided. The method includes: transmitting a first sounding reference signal for uplink channel measurement on a first antenna by using at least one power amplifier among a plurality of power amplifiers; and transmitting a second sounding reference signal for uplink channel measurement on a second antenna by using the at least one power amplifier, wherein the first sounding reference signal and the second sounding reference signal are transmitted using different time regions when using one power amplifier, and the first sounding reference signal and the second sounding reference signal are transmitted using different time regions or different frequency regions when using the plurality of power amplifiers.

According to another aspect of the present invention, a power control method of an uplink control signal in a multiple antenna system is provided. The method includes: obtaining a parameter for uplink control signal transmission of multiple antennas using a plurality of power amplifiers; selecting at least one power amplifier to be used by the multiple antennas among the plurality of power amplifiers according to the parameter; and determining transmit power on uplink control signal transmission through the multiple antennas using the selected at least one power amplifiers, wherein the parameter comprises selection information on the plurality of power amplifiers.

DESCRIPTION OF EXEMPLARY EMBODIMENTS

Figure 1:
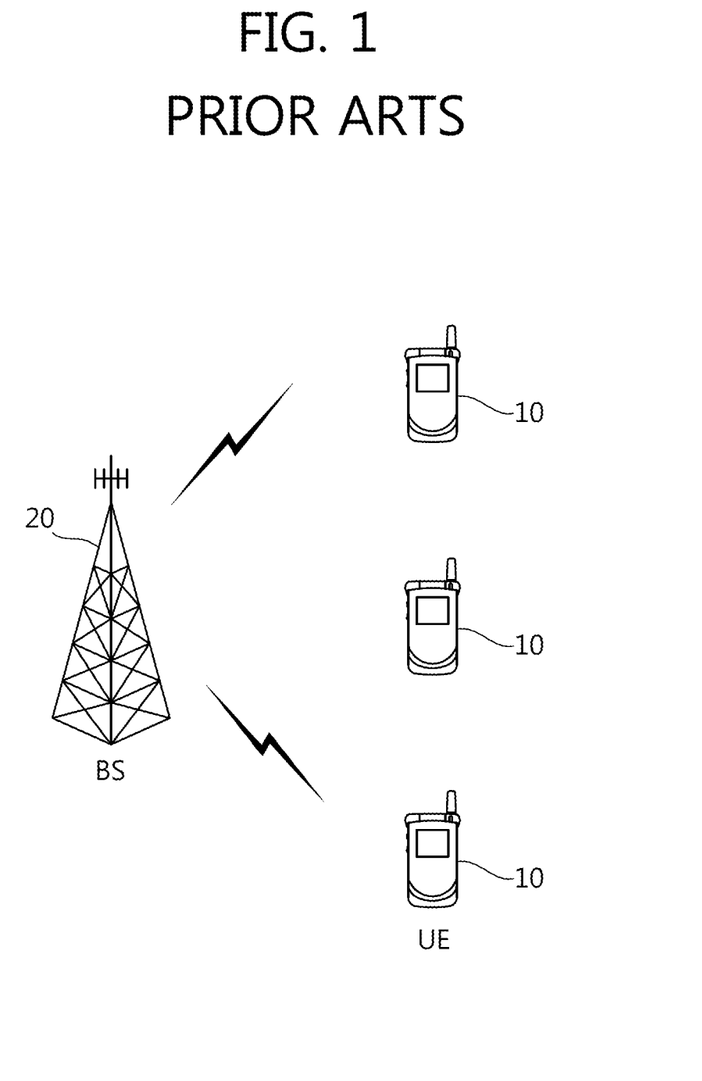
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT on the data. The receiver restores original data by performing FFT on a received signal. The transmitter uses IFFT to combine the plurality of subcarriers, and the receiver uses FFT to split the plurality of subcarriers.

One of main problems of the OFDM/OFDMA system is that peak-to-average power ratio (PAPR) can be significantly large. The PAPR problem occurs when a peak amplitude of a transmit (Tx) signal is significantly larger than an average amplitude. Further, the PAPR problem is caused by a fact that an OFDM symbol is an overlap of N sinusoidal signals on different subcarriers. The PAPR is particularly problematic in a UE sensitive to power consumption in association with battery capacity. The PAPR needs to be lowered to reduce power consumption.

Single carrier-frequency division multiple access (SC-FDMA) is proposed to decrease the PAPR. The SC-FDMA is single carrier-frequency division equalization (SC-FDE) combined with frequency division multiple access (FDMA). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR. In particular, regarding battery usage, the SC-FDMA is advantageous in case of uplink transmission where communication is achieved from a UE sensitive to Tx power to a BS. In the SC-FDMA system, a symbol of each antenna path is DFT spread, and precoded symbols are mapped to subcarriers using localized mapping or interleaved mapping or the like to maintain a low PAPR. The OFDM symbol may be used in the same meaning as the SC-FDMA symbol.

When the UE transmits data to the BS, the transmitted data does not require a large bandwidth but a wide coverage is important for power concentration. The SC-FDMA system allows a small signal variation, and thus has a much wider coverage than other systems when using the same power amplifier.

Meanwhile, unlike the SC-FDMA system, clustered DFT-spread-OFDM (DFT-S-OFDM) allocates (or maps) M(<N) symbol streams among N symbol streams which are DFT spread, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multiuser scheduling gain in a corresponding dimension. The STBC is a scheme for applying selectivity in the space domain and a time domain. The FSTD is a scheme in which signals transmitted to multiple antennas are divided in the frequency domain, and the TSTD is a scheme in which the signals transmitted to the multiple antennas are divided in the time domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
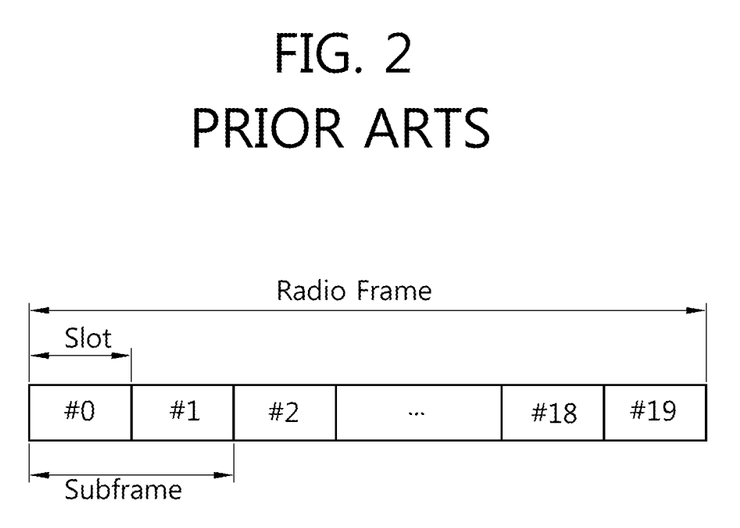
FIG. 2 shows a structure of a radio frame.

FIG. 2 shows a structure of a radio frame.

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 2 is shown for exemplary purposes only. Thus, the number of subframes included in the radio frame or the number of slots included in the subframe may change variously.

Figure 3:
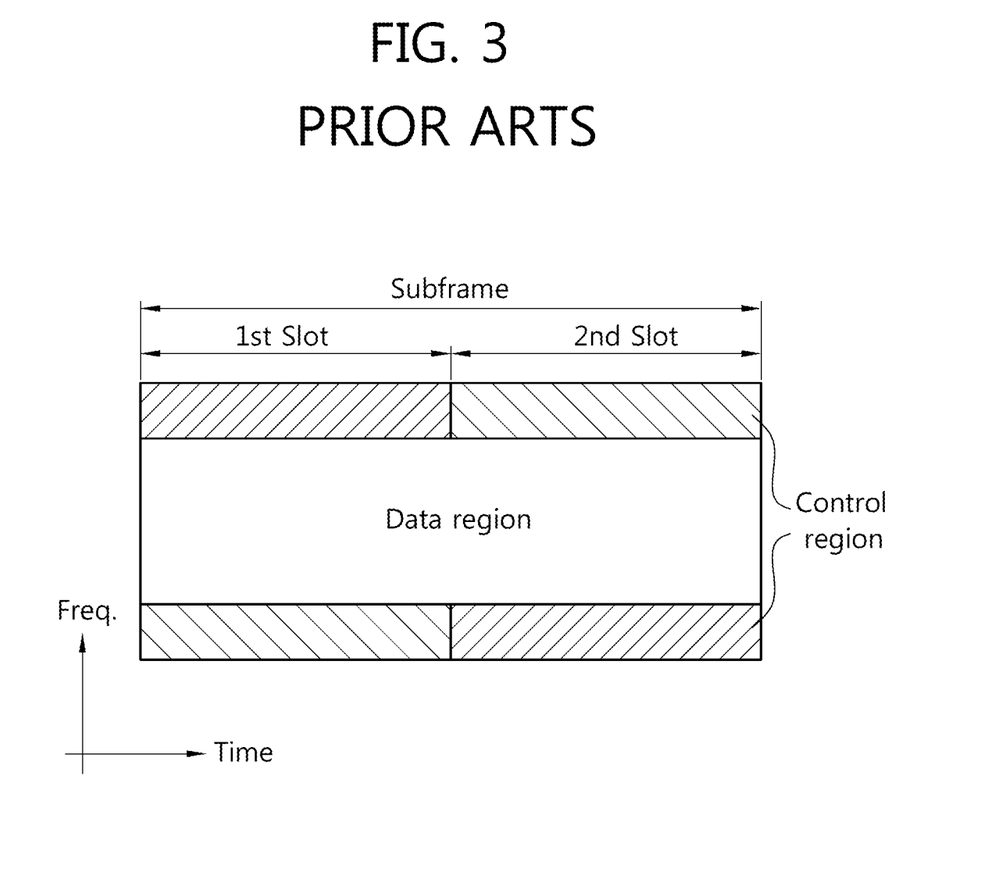
FIG. 3 shows an example of a subframe.

FIG. 3 shows an example of a subframe. A radio resource in a physical layer is shown herein.

Referring to FIG. 3, the subframe may be divided into a control region and a data region in the physical layer. The control region is for carrying control information. The data region is for carrying user data. Examples of the control information include various types of information such as an acknowledgement (ACK)/negative-acknowledgement (NACK) signal, a channel quality indicator (CQI), a scheduling request signal, multiple input multiple output (MIMO) control information, etc. The control region may be used to carry the control information alone. The data region may be used to carry both the user data and the control information. That is, when a UE transmits the control information alone, the control information may be transmitted through the control region, and when the UE transmits both the user data and the control information, the control information may be transmitted through the control region or may be transmitted through the data region by multiplexing the user data and the control information. A physical uplink control channel (PUCCH) is an example of a channel for transmitting the control information through the control region in an uplink. A physical uplink shared channel (PUSCH) is an example of a channel for transmitting the user data and the control information through the data region in an uplink.

The subframe may be divided into two slots in a time domain. The slot is a unit of radio resource allocation in the time domain and a frequency domain. One slot may include a plurality of OFDM symbols in the time domain and at least one subcarrier in the frequency domain. For example, one slot can include 7 or 6 OFDM symbols. The subframe can include a plurality of resource blocks (RBs). The RB is a basic unit of radio resources allocated to the UE. The RB may include a plurality of subcarriers. For example, the RB may be a region consisting of 12 contiguous subcarriers in the frequency domain and one slot in the time domain. 10 subframes may constitute one radio frame.

The subframe divides a frequency band into 3 parts. Two parts at both ends of the frequency band are used as the control region, and a middle part of the frequency band is used as the data region. Since the control region and the data region use different frequency bands, frequency division multiplexing (FDM) is achieved. This is for exemplary purposes only, and thus the arrangement of the control region and the data region in the subframe is not limited thereto. In addition, the number of subframes included in the radio frame, the number of slots included in the subframe, and the number of OFDM symbols included in the slot may change variously.

The slot assigned to each UE may be frequency-hopped in the subframe. That is, one of two slots assigned to one UE may be assigned to one side of the frequency band, and the other slot may be assigned to the other side of the frequency band. A frequency diversity gain can be obtained by transmitting the control channel for one UE through the slots assigned to the different frequency bands. In addition, a plurality of users may be multiplexed by code division multiplexing (CDM).

Figure 4:
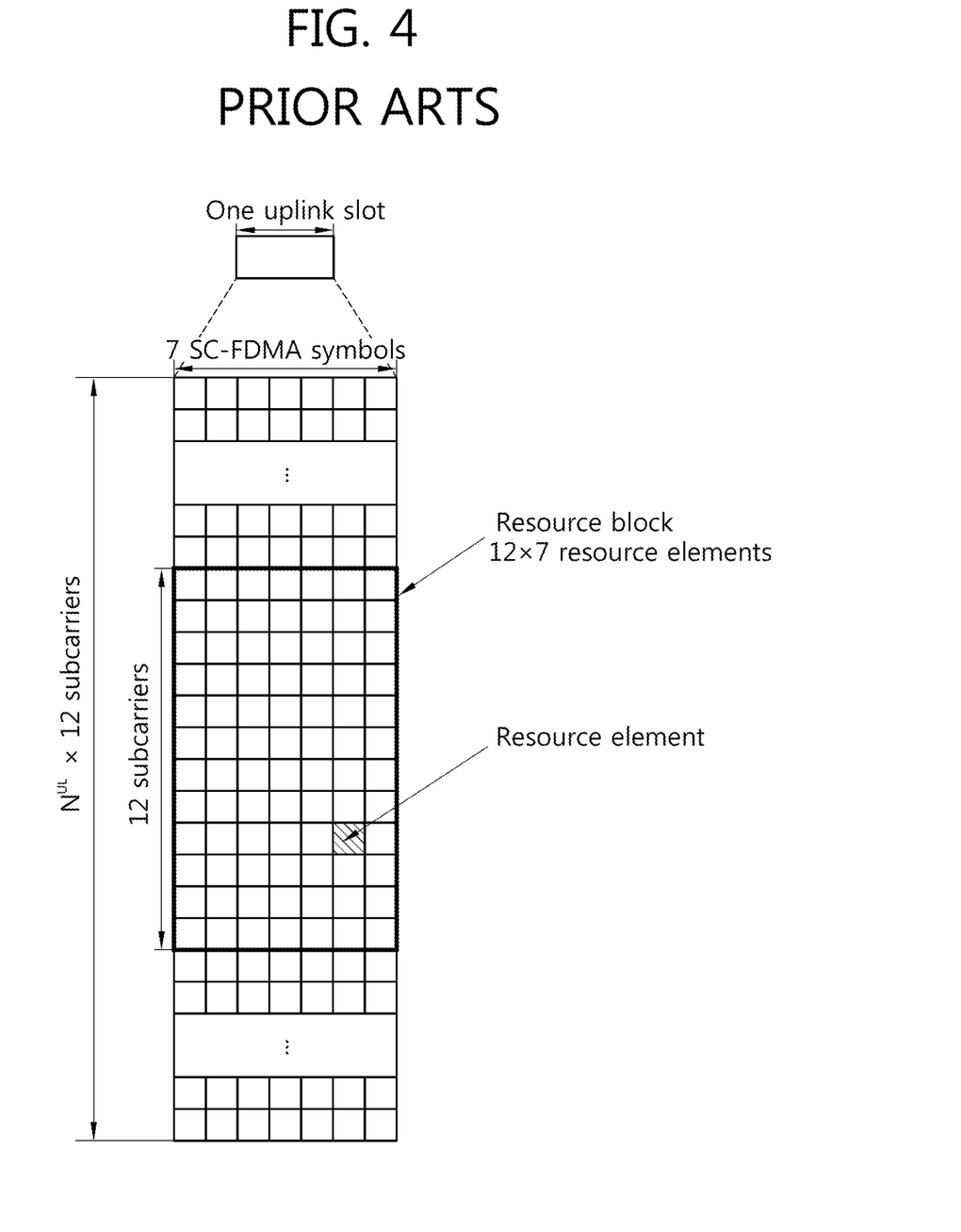
FIG. 4 shows an example of a resource grid for one uplink slot.

FIG. 4 shows an example of a resource grid for one uplink slot.

Referring to FIG. 4, an uplink slot includes a plurality of SC-FDMA symbols in a time domain and includes a plurality of RBs in a frequency domain. Although it has been described herein that one uplink slot includes 7 SC-FDMA symbols and one RB includes 12 subcarriers, this is for exemplary purposes only, and thus the present invention is not limited thereto.

Each element on the resource grid is referred to as a resource element, and one RB includes 12×7 resource elements. The number $N^{UL}$ of RBs included in the uplink slot depends on an uplink transmission bandwidth determined in a cell.

Figure 5:
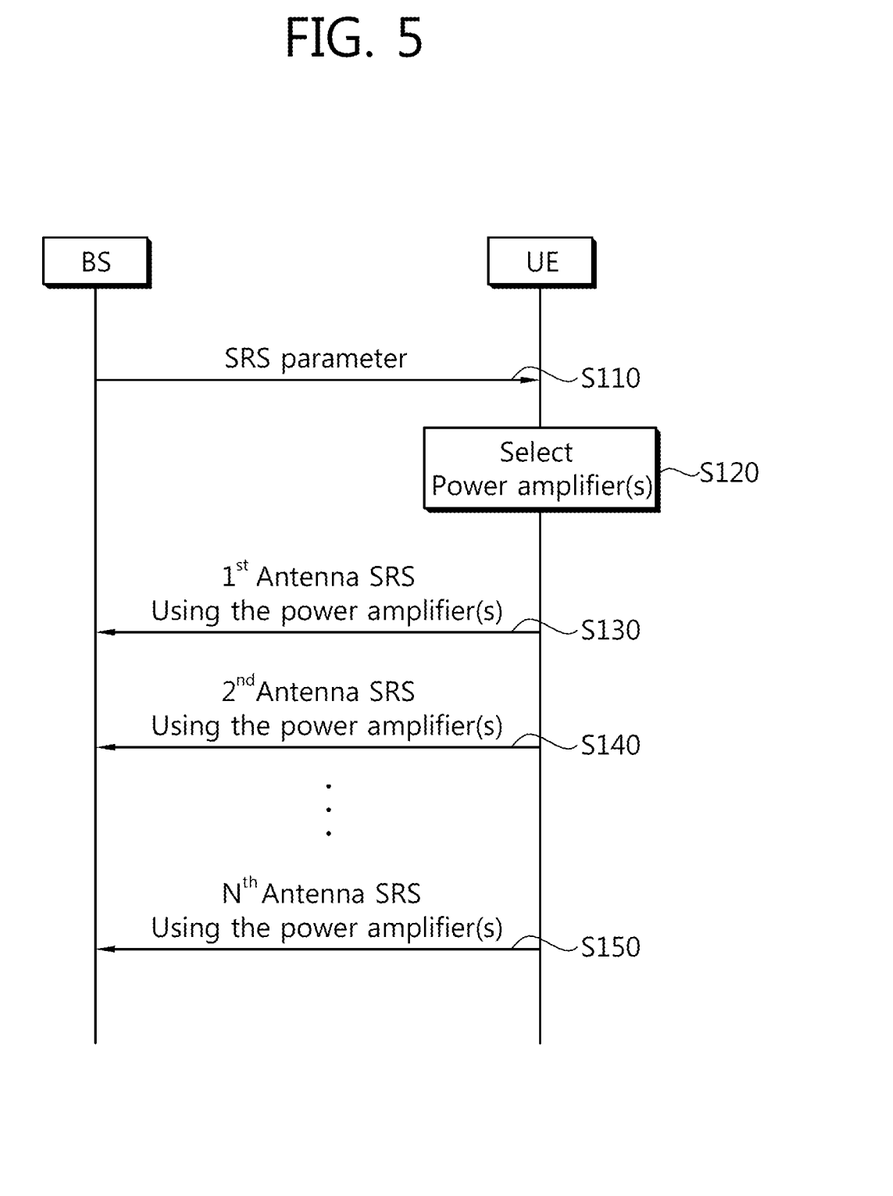
FIG. 5 shows a method of transmitting a control signal in a multiple antenna system according to an embodiment of the present invention.

FIG. 5 shows a method of transmitting a control signal in a multiple antenna system according to an embodiment of the present invention.

Referring to FIG. 5, a process of transmitting a sounding reference signal (SRS) by a UE having a plurality of power amplifiers in a multiple antenna system will be described for example. The SRS is a reference signal transmitted from the UE to a BS in order to measure an uplink channel state. The SRS may be transmitted using the entirety or part of a system bandwidth. Although the SRS is exemplified hereinafter, the proposed invention can also apply to an uplink control signal using the entirety or part of the system bandwidth.

The UE obtains an SRS parameter from the BS (step S110). The SRS parameter may be configured as a UE specific semi-static parameter by a higher layer. The SRS parameter may be implicitly reported to the UE without having to be directly transmitted from the BS. For example, the SRS parameter may be implicitly determined according to a downlink control information (DCI) type specified by the BS. The SRS parameter may include an SRS transmission period, an SRS subframe offset, an SRS bandwidth, a frequency hopping bandwidth, an SRS cyclic shift value, selection information of multiple power amplifiers, etc. The selection information of the multiple power amplifiers may include a power value for SRS transmission, an SRS transmission order for each antenna, an SRS transmission bandwidth for an amplifier with a low output, a precoding weight for antenna combination, etc.

The UE selects at least one power amplifier to be used for multiple antennas for SRS transmission among a plurality of power amplifiers according to the SRS parameter (step S120). Selection of the power amplifier may differ depending on a configuration of the power amplifier employed by the UE. The number of power amplifiers used by the UE may be equal to or less than the number of Tx antennas employed by the UE. For example, a UE having 4 Tx antennas may use 4 power amplifiers or 2 power amplifiers. A maximum power of the plurality of power amplifiers used by the UE may be configured variously.

It is assumed hereinafter that a maximum power of a UE using a single power amplifier is 23 dBm, the power amplifier having a maximum power of 23 dBm is referred to as a maximum power amplifier (MPA), a power amplifier having a maximum power less than 23 dBm is referred to as a lower power amplifier (LPA), and a power amplifier having a maximum power relatively higher among the LPAs is referred to as a higher power amplifier (HPA).

Table 1 shows an exemplary configuration of a power amplifier having various maximum outputs when a UE having 4 Tx antennas uses 4 power amplifiers.

TABLE 1

| $1^{st}$ power amplifier | $2^{nd}$ power amplifier | $3^{rd}$ power amplifier | $4^{th}$ power amplifier |
| --- | --- | --- | --- |
| 23 dBm | 23 dBm | 23 dBm | 23 dBm |
| 23 dBm | 23 dBm | 20 dBm | 20 dBm |
| 23 dBm | 20 dBm | 20 dBm | 20 dBm |
| 23 dBm | 23 dBm | 17 dBm | 17 dBm |
| 23 dBm | 17 dBm | 17 dBm | 17 dBm |
| 17 dBm | 17 dBm | 17 dBm | 17 dBm |
| 20 dBm | 20 dBm | 17 dBm | 17 dBm |

Table 2 shows an exemplary configuration of a power amplifier having various maximum outputs when a UE having 4 Tx antennas or 2 Tx antennas use 2 power amplifiers.

TABLE 2

| $1^{st}$ power amplifier | $2^{nd}$ power amplifier |
| --- | --- |
| 23 dBm | 23 dBm |
| 23 dBm | 20 dBm |
| 23 dBm | 17 dBm |
| 20 dBm | 20 dBm |

At least one of a plurality of power amplifiers may consist of an MPA. Alternatively, instead of allowing the MPA to be included in the plurality of power amplifiers, power amplifiers may be configured such that a sum of maximum powers of LPAs is 23 dBm. This is to allow a maximum power of at least one power amplifier selected for SRS transmission among the plurality of power amplifiers to be equal to a maximum power of the MPA.

If a UE having LPAs approaches to a communication system permitting only single antenna transmission, the UE may perform rank-1 transmission to have the same effect as single antenna transmission. For example, when signals with the same Tx power are transmitted from all Tx antennas by using a rank-1 precoding vector, the BS can receive multiple antenna transmission of the UE as if it is single antenna transmission. If a UE having at least one MPA among the plurality of power amplifiers approaches to the communication system permitting only single antenna transmission, single antenna transmission can be performed by using the MPA.

As such, Tx power for SRS transmission through multiple antennas is determined according to one or more power amplifiers selected among power amplifiers with various configurations.

The UE transmits an SRS of a first antenna by using at least one selected power amplifier (step S130). The UE transmits an SRS of a second antenna by using at least one selected power amplifier (step S140). The UE transmits an SRS of an $N^{th}$ antenna by using at least one selected power amplifier (step S150). Assume that the UE has N Tx antennas and N or M power amplifiers (N>M>1, where N and M are integers). According to a configuration of a power amplifier employed by the UE, a method of transmitting an SRS for the N Tx antennas can be determined as follows.

(1) If at least one MPA is included among the plurality of power amplifiers employed by the UE, an SRS is transmitted by using one MPA. If one power amplifier is an MPA or has a greater maximum power than other power amplifiers among the N or M power amplifiers, the SRS is transmitted by using a power amplifier having a maximum output. As such, if the SRS is transmitted by using one power amplifier, the SRS may be transmitted orthogonally in a time region to measure a channel state for each Tx antenna. That is, if one power amplifier is used, SRSs of respective antennas may be transmitted using different time regions. For example, an SRS of a first antenna to an SRS of an $N^{th}$ antenna may be transmitted using different subframes. The same power value for SRS transmission may be applied to all Tx antennas.

(2) If L power amplifiers among the N or M power amplifiers have greater outputs than other power amplifiers, an SRS is transmitted using L HPAs (M>L>1, where L is an integer). As such, if the SRS is transmitted using a plurality of HPAs, SRSs of respective Tx antennas may be transmitted orthogonally in time regions and/or frequency regions. That is, when using a plurality of power amplifiers, SRSs of respective antennas may be transmitted using different time regions and/or frequency regions. The same power value for SRS transmission may be applied to all Tx antennas.

(3) If a power amplifier of a UE consists of LPAs, each antenna's SRS is transmitted using a bandwidth smaller than a system bandwidth. A transmission bandwidth of an SRS for a power amplifier with a low output can be known by using an SRS parameter. If the transmission bandwidth of the SRS decreases, the SRS may be transmitted with an output corresponding to a maximum power of an MPA by using only the LPA.

(4) When the power amplifier of the UE consists of only an LPA, an SRS is transmitted by combining antennas using any precoding weight. A maximum power of the UE may be increased by applying the precoding weight for antenna combination. A precoding weight of a first precoded SRS of any antenna combination and a precoding weight of a second precoded SRS of another antenna combination may be orthogonal to each other.

Hereinafter, SRS transmission from a UE having a plurality of power amplifiers in a multiple antenna system will be described. It is assumed that the UE has 4 Tx antennas, and an SRS transmission period is one subframe. This is for exemplary purposes only, and thus the number of Tx antennas of the UE and the SRS transmission period are not limited thereto.

Figure 6:
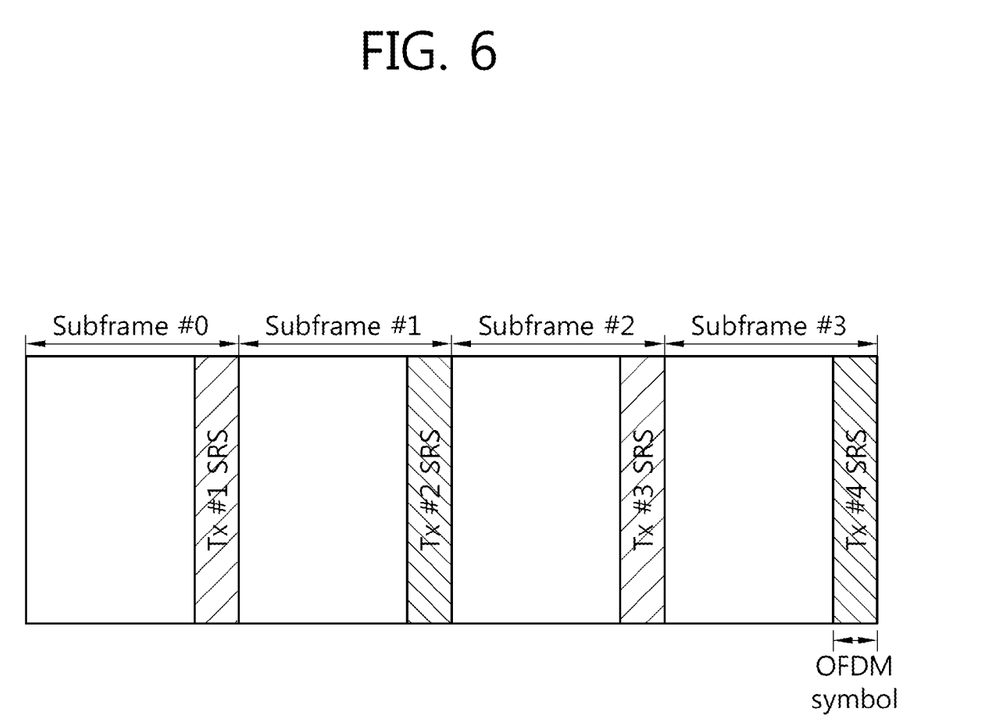
FIG. 6 shows sounding reference signal (SRS) transmission in a multiple antenna system according to an embodiment of the present invention.
Figure 7:
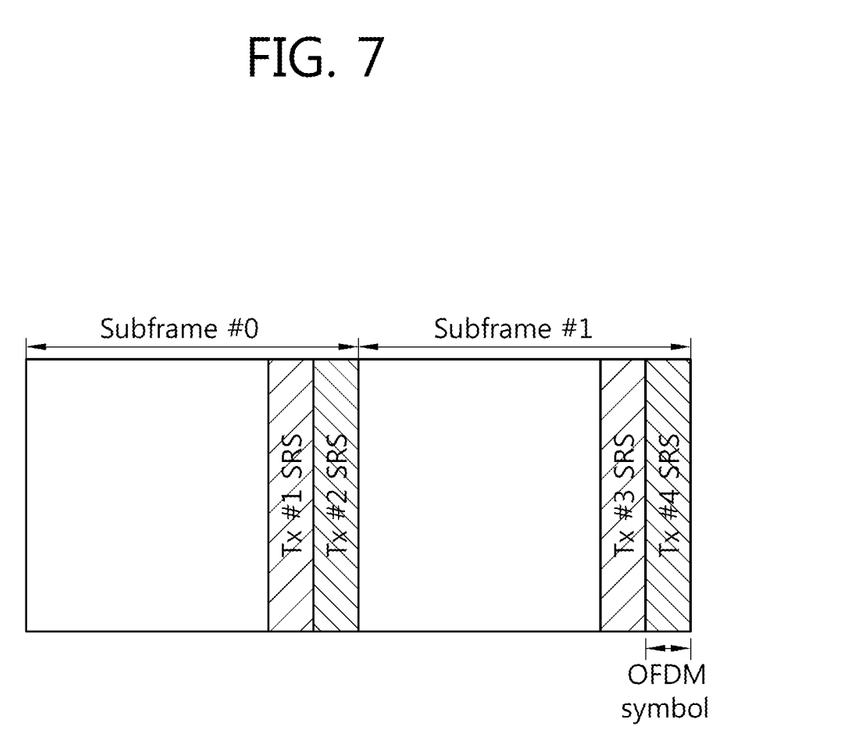
FIG. 7 shows SRS transmission in a multiple antenna system according to another embodiment of the present invention.
Figure 8:
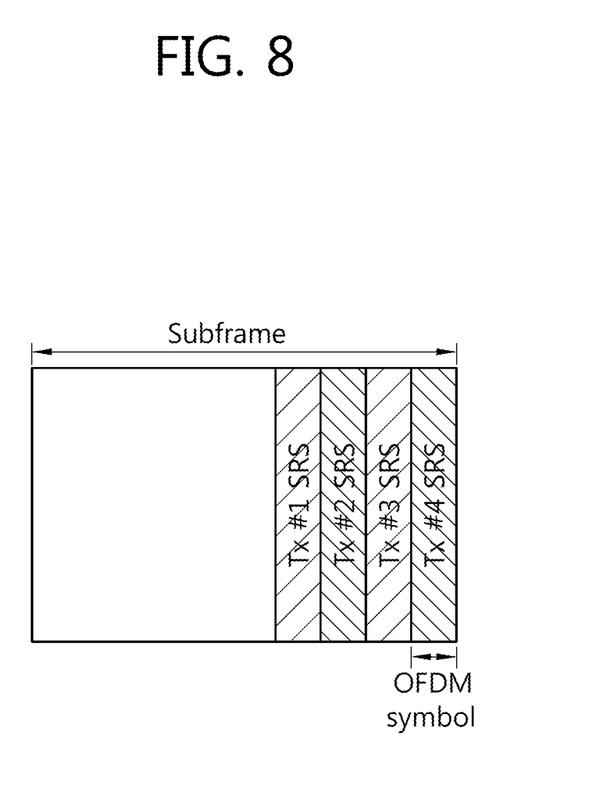
FIG. 8 shows SRS transmission in a multiple antenna system according to another embodiment of the present invention.

FIG. 6 shows SRS transmission in a multiple antenna system according to an embodiment of the present invention. FIG. 7 shows SRS transmission in a multiple antenna system according to another embodiment of the present invention. FIG. 8 shows SRS transmission in a multiple antenna system according to another embodiment of the present invention.

Referring to FIG. 6 to FIG. 8, when at least one MPA is included among a plurality of power amplifiers employed by a UE, each antenna's SRS is transmitted using the MPA. Alternatively, an SRS may be transmitted with an output corresponding to a maximum power of the MPA by using two or more HPAs. Each antenna's SRS may be transmitted using a full bandwidth or a bandwidth of a PUSCH.

In FIG. 6, SRSs of respective antennas may be transmitted one by one in every SRS transmission period. An SRS of one antenna is transmitted using one subframe, and an SRS of another antenna is transmitted using another subframe. That is, SRSs of all antennas may be transmitted with a period of 4 SRSs (i.e., an SRS period corresponding to the number of Tx antennas employed by the UE). In each subframe, the SRS may occupy one OFDM symbol. Each antenna's SRS may be transmitted using a last OFDM symbol of each subframe.

In FIG. 7, for each antenna, two SRSs may be transmitted in every SRS transmission period. SRSs of two antennas are transmitted using one subframe, and SRSs of another two antennas are transmitted using another subframe. That is, SRSs of all antennas may be transmitted with a period of 2 SRSs. In each subframe, two SRSs may occupy contiguous OFDM symbols, or may occupy OFDM symbols separated with a specific distance.

In FIG. 8, for each antenna, 4 SRSs may be transmitted in every SRS transmission period. That is, SRSs of 4 antennas are transmitted using one subframe. In the subframe, 4 SRSs may occupy contiguous OFDM symbols or may occupy OFDM symbols separated with a specific distance. SRSs of all antennas may be transmitted with a period of one SRS.

An SRS transmission order for each antenna may be specified by the SRS parameter or may be predetermined, and there is no restriction on the SRS transmission order for each antenna. An SRS position in the subframe is shown for exemplary purposes only, and thus each antenna's SRS may be positioned in any location in the subframe.

Figure 9:
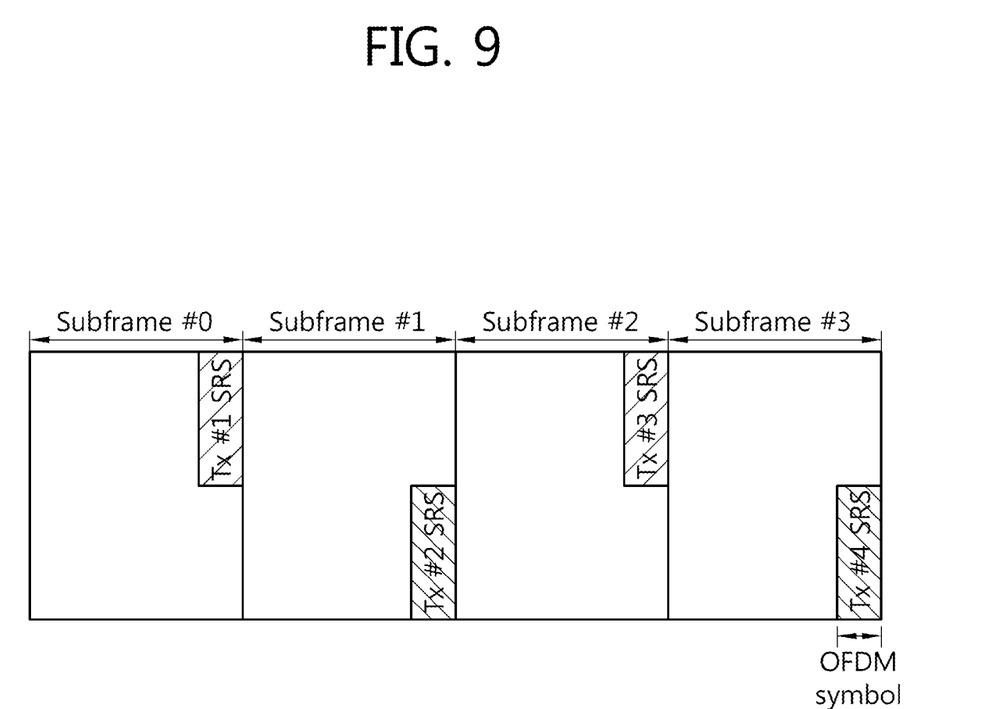
FIG. 9 shows SRS transmission in a multiple antenna system according to another embodiment of the present invention.
Figure 10:
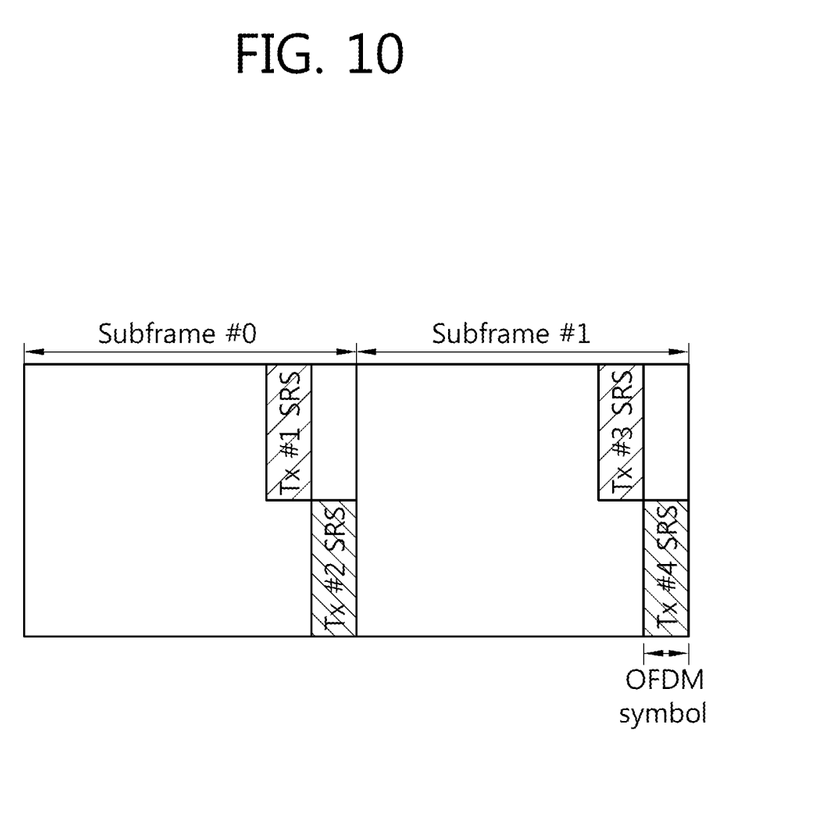
FIG. 10 shows SRS transmission in a multiple antenna system according to another embodiment of the present invention.
Figure 11:
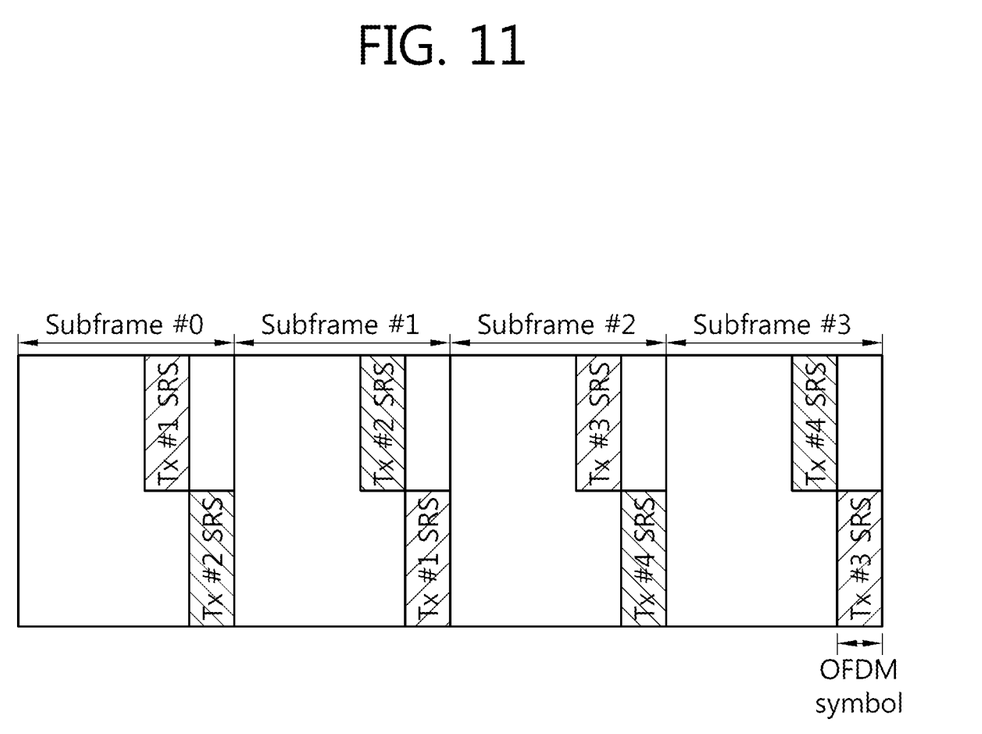
FIG. 11 shows SRS transmission in a multiple antenna system according to another embodiment of the present invention.

FIG. 9 shows SRS transmission in a multiple antenna system according to another embodiment of the present invention. FIG. 10 shows SRS transmission in a multiple antenna system according to another embodiment of the present invention. FIG. 11 shows SRS transmission in a multiple antenna system according to another embodiment of the present invention.

Referring to FIGS. 9 to 11, when a power amplifier of a UE consists of only an LPA, each antenna's SRS is transmitted using a bandwidth smaller than a system bandwidth. The bandwidth of the SRS may be indicated by an SRS parameter. Each antenna's SRS may be transmitted using a partial bandwidth of a PUSCH.

In FIG. 9, SRSs of respective antennas may be transmitted one by one in every SRS transmission period. An SRS of one antenna is transmitted using one subframe, and an SRS of another antenna is transmitted using another subframe. That is, SRSs of all antennas may be transmitted with a period of 4 SRSs (i.e., an SRS period corresponding to the number of Tx antennas employed by the UE). In each subframe, an SRS may occupy one OFDM symbol. Each antenna's SRS may be transmitted using a last OFDM symbol of each subframe.

In FIG. 10, for each antenna, 2 SRSs may be transmitted in every SRS transmission period. SRSs of two antennas are transmitted using one subframe, and SRSs of another two antennas are transmitted using another subframe. That is, SRSs of all antennas may be transmitted with a period of 2 SRSs. In each subframe, 2 SRSs may occupy contiguous OFDM symbols or may occupy OFDM symbols separated with a specific distance.

In FIG. 11, each antenna's SRS may be transmitted using a part of a full bandwidth in one subframe and may be transmitted using the remaining parts of the full bandwidth in another subframe. That is, one antenna's SRSs with different frequency bands may be transmitted using a plurality of subframes, and by using the SRSs, a channel state of a full bandwidth of a corresponding antenna may be measured. It is described herein that, for each antenna, 2 SRSs are transmitted using one subframe and SRSs with different frequency bands are transmitted using contiguous subframes. Therefore, SRSs of all antennas are transmitted with a period of 4 SRSs. Alternatively, SRSs with different frequency bands may be transmitted using contiguous subframes while SRSs of respective antennas are transmitted one by one using one subframe. In this case, SRSs of all antennas are transmitted with a period of 8 SRSs.

An SRS transmission order for each antenna may be specified by the SRS parameter or may be predetermined, and there is no restriction on the SRS transmission order for each antenna. An SRS position in the subframe is shown for exemplary purposes only, and thus each antenna's SRS may be positioned in any location in the subframe.

Figure 12:
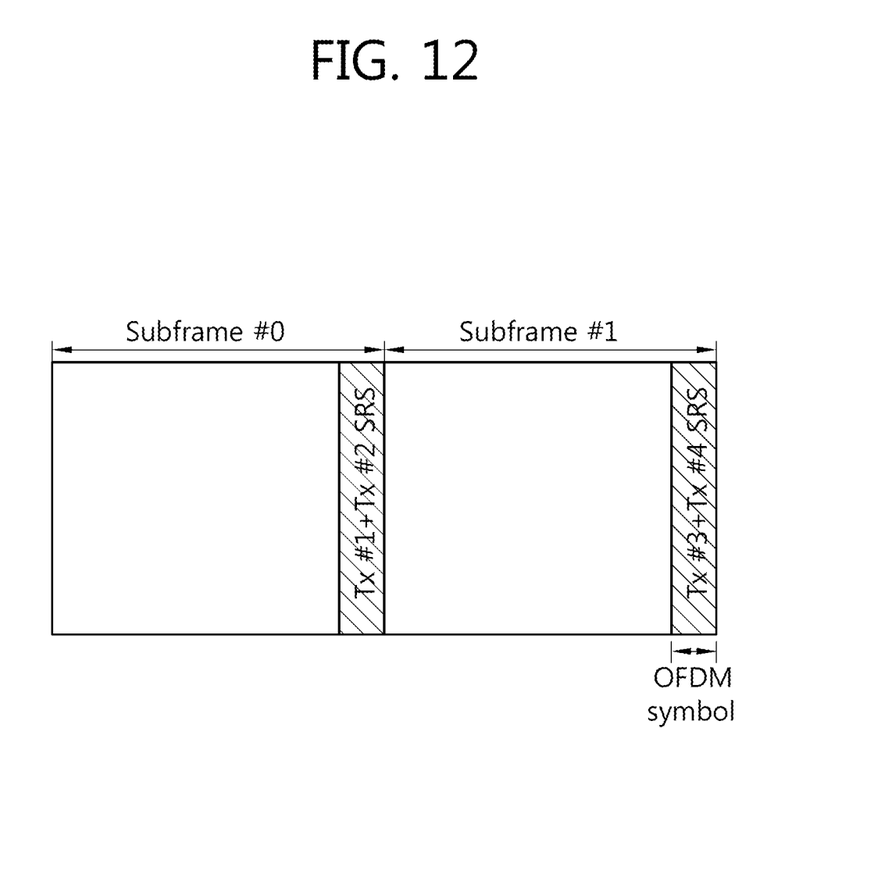
FIG. 12 shows SRS transmission in a multiple antenna system according to another embodiment of the present invention.
Figure 13:
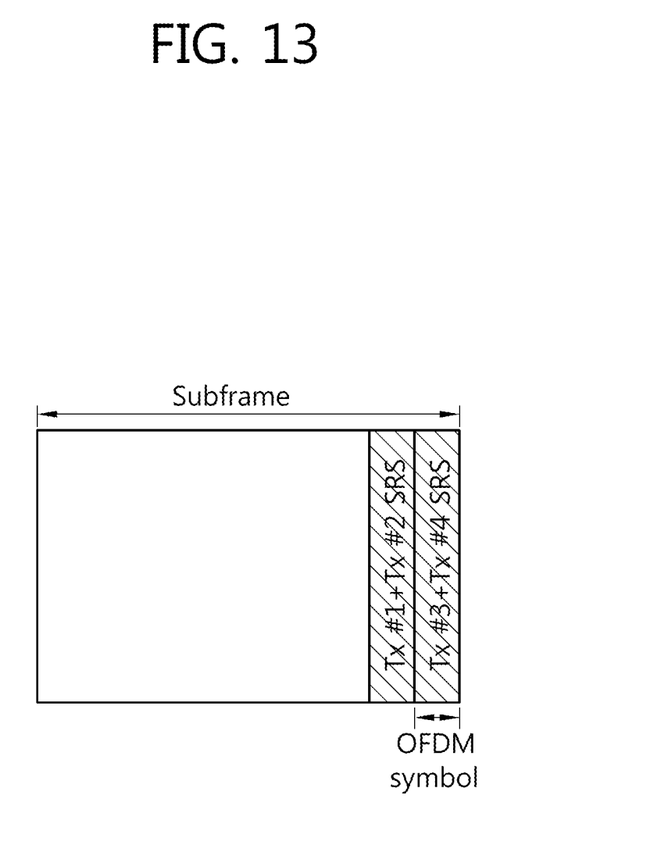
FIG. 13 shows SRS transmission in a multiple antenna system according to another embodiment of the present invention.

FIG. 12 shows SRS transmission in a multiple antenna system according to another embodiment of the present invention. FIG. 13 shows SRS transmission in a multiple antenna system according to another embodiment of the present invention.

Referring to FIGS. 12 and 13, when a power amplifier of a UE consists of only an LPA, an SRS is transmitted by combining antennas by the use of any precoding weight. A bandwidth of the SRS may be indicated by an SRS parameter. Each antenna's SRS may be transmitted using a full bandwidth or a part of a PUSCH bandwidth.

In FIG. 12, one SRS of two antennas combined using a precoding weight may be transmitted in every SRS transmission period. For example, an SRS of a first antenna Tx#1 and a second antenna Tx#2 combined using a first precoding weight may be transmitted using a subframe #0, and an SRS of a third antenna Tx#3 and a fourth antenna Tx#4 combined using a second precoding weight may be transmitted using a subframe #1. The number of antennas combined using the precoding weight is not limited, and a position of the precoded SRS in the subframe is not limited.

In FIG. 13, SRSs of two antennas combined using a precoding weight may be transmitted in one SRS transmission period. For example, an SRS of a first antenna Tx#1 and a second antenna Tx#2 combined using a first precoding weight and an SRS of a third antenna Tx#3 and a fourth antenna Tx#4 combined using a second precoding weight orthogonal to the first precoding weight may be transmitted using one subframe. Two precoded SRSs may be transmitted using contiguous OFDM symbols or may be transmitted using OFDM symbols separated with a predetermined interval.

According to the present invention, an uplink reference signal can be effectively transmitted from a user equipment using a plurality of power amplifiers in a multiple antenna system.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting an uplink reference signal in a multiple antenna system, performed by a user equipment (UE) having a plurality of power amplifiers and a plurality of antennas, the method comprising:

transmitting a first sounding reference signal for uplink channel measurement on a first antenna; and transmitting a second sounding reference signal for uplink channel measurement on a second antenna, wherein the first sounding reference signal and the second sounding reference signal are transmitted using different time regions and a same frequency region when using one power amplifier having maximum power among the plurality of power amplifiers, and wherein the first sounding reference signal and the second sounding reference signal are transmitted using a same time region and different frequency regions when using the plurality of power amplifiers, wherein a sum of powers of the plurality of power amplifiers is configured to be identical with the maximum power.

2. The method of claim 1, wherein, when using one power amplifier having the maximum output among the plurality of power amplifiers, the first sounding reference signal and the second sounding reference signal are transmitted using different subframes and an entirety of a system bandwidth.

3. The method of claim 1, wherein, when using the plurality of power amplifiers, the first sounding reference signal and the second sounding reference signal are combined by using a precoding weight for combining antennas.

4. The method of claim 1, wherein a orthogonal precoding weight for combining antennas is applied to the first sounding reference signal and the second sounding reference signal.

5. The method of claim 1, further comprising receiving a sounding reference signal parameter for transmission of the first sounding reference signal and the second sounding reference signal, wherein the sounding reference signal parameter includes selection information of multiple power amplifiers which indicates a power value of each of the plurality of the power amplifiers.

6. The method of claim 1, wherein, when using the plurality of power amplifiers, the first sounding reference signal is transmitted using a subframe and a part of a system bandwidth and the second sounding reference signal is transmitted using the subframe and a remaining part of the system bandwidth.

7. A power control method of sounding reference signals in a multiple antenna system, performed by a user equipment (UE) having a plurality of power amplifiers and a plurality of antennas, the power control method comprising:

obtaining a parameter for sounding reference signal (SRS) transmission of multiple antennas using the plurality of power amplifiers;

selecting at least one power amplifier to be used by the multiple antennas among the plurality of power amplifiers according to the parameter; and determining transmit power on SRS transmission through the multiple antennas using the selected at least one power amplifier, wherein the parameter comprises selection information on the at least one power amplifier, wherein a first sounding reference signal and a second sounding reference signal are transmitted using different time regions and a same frequency region when using one power amplifier having maximum power among the plurality of power amplifiers, and wherein the first sounding reference signal and the second sounding reference signal are transmitted using a same time region and different frequency regions when using the plurality of power amplifiers, wherein a sum of powers of the plurality of power amplifiers is configured to be identical with the maximum power.

8. The power control method of claim 7, wherein the parameter is a user equipment specific semi-static parameter and is configured by a higher layer.

9. The power control method of claim 7, wherein the parameter comprises transmission periods and bandwidth information of the first sounding reference signal and the second sounding reference signal.

* * * * *